US007658487B2

(12) United States Patent
Yamashita et al.

(10) Patent No.: US 7,658,487 B2
(45) Date of Patent: Feb. 9, 2010

(54) LIQUID DROP EJECTING DEVICE, CONTROLLER THEREFOR, LIQUID DROP EJECTING METHOD, AND STORAGE MEDIUM STORING A PROGRAM

(75) Inventors: Kunichi Yamashita, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 260 days.

(21) Appl. No.: 11/446,633

(22) Filed: Jun. 5, 2006

(65) Prior Publication Data

US 2007/0146396 A1 Jun. 28, 2007

(30) Foreign Application Priority Data

Dec. 26, 2005 (JP) ............................ 2005-373533

(51) Int. Cl.
*G01D 11/00* (2006.01)

(52) U.S. Cl. ............................ 347/100; 347/9; 347/15

(58) Field of Classification Search ........... 347/98–100, 347/5, 9, 40–43, 15
See application file for complete search history.

(56) References Cited

U.S. PATENT DOCUMENTS 6,267,476 B1 * 7/2001 Kato et al. .................. 347/100
6,273,549 B1 * 8/2001 Wetchler et al. .............. 347/43

FOREIGN PATENT DOCUMENTS

JP 2002-067296 3/2002
JP 2002-067297 3/2002
JP 2004-122534 4/2004

* cited by examiner

*Primary Examiner*—Lam S Nguyen
(74) *Attorney, Agent, or Firm*—Fildes & Outland, P.C.

(57) ABSTRACT

A controller for a liquid drop ejecting device including a first head with plural first liquid drop ejectors, and a second head with plural second liquid drop ejectors, is provided. The controller includes: a scanning controlling section scanning at least the first head plural times a same region of a recording medium; and an ejection controlling section controlling the first and second head such that a proportion of an applied amount, per unit surface area, of the second liquid drops with respect to an applied amount, per unit surface area, of the first liquid drops in a first scan, is within a range of 0 to a first value, and the proportion in scans from a second scan on is within a range of a second value to 1, and the proportion in the first scan is smaller than the proportion in the scans from the second scan on.

22 Claims, 9 Drawing Sheets

FIG.8

| | | APPLIED AMOUNT ($mg/cm^2$) PER UNIT SURFACE AREA | | | | DROP AMOUNT (pl) | | | | R1st./I1st | R2nd./I2nd | RECORDING METHOD |
|---|---|---|---|---|---|---|---|---|---|---|---|---|
| | | FIRST PASS | | SECOND PASS | | FIRST PASS | | SECOND PASS | | | | |
| | | REACTION LIQUID R1st. | INK I1st. | REACTION LIQUID R2nd. | INK I2nd. | REACTION LIQUID DR1st. | INK DI1st. | REACTION LIQUID DR2nd. | INK DI2nd. | | | |
| EXAMPLE | 1 | 0.00 | 0.45 | 0.22 | 0.67 | 0 | 2 | 1 | 3 | 0.00 | 0.33 | |
| | 2 | 0.06 | 0.45 | 0.33 | 0.67 | 1 | 2 | 1.5 | 3 | 0.13 | 0.50 | FIRST PASS REACTION LIQUID RECORDED IN A 25% THINNING PATTERN |
| | 3 | 0.00 | 0.67 | 0.22 | 0.45 | 0 | 3 | 1 | 4 | 0.00 | 0.50 | SECOND PASS INK RECORDED IN A 50% THINNING PATTERN |
| | 4 | 0.00 | 0.45 | 0.22 | 0.67 | 0 | 4 | 1 | 3 | 0.00 | 0.33 | FIRST PASS INK RECORDED IN A 50% THINNING PATTERN |
| | 5 | 0.00 | 0.89 | 0.22 | 0.67 | 0 | 4 | 1 | 3 | 0.00 | 0.33 | |
| | 6 | 0.11 | 0.67 | 0.22 | 0.62 | 2 | 3 | 1 | 4 | 0.17 | 0.36 | FIRST PASS REACTION LIQUID RECORDED IN A 25% THINNING PATTERN SECOND PASS INK RECORDED IN A 70% THINNING PATTERN |
| | 7 | 0.06 | 0.50 | 0.22 | 0.67 | 1 | 3 | 1 | 3 | 0.11 | 0.33 | FIRST PASS REACTION LIQUID RECORDED IN A 25% THINNING PATTERN FIRST PASS INK RECORDED IN A 75% THINNING PATTERN |
| | 8 | 0.06 | 0.67 | 0.22 | 0.67 | 1 | 3 | 1 | 3 | 0.08 | 0.33 | FIRST PASS REACTION LIQUID RECORDED IN A 25% THINNING PATTERN |
| | 9 | 0.00 | 0.45 | 0.11 | 0.89 | 0 | 2 | 0.5 | 4 | 0.00 | 0.13 | |
| | 10 | 0.13 | 0.45 | 0.22 | 0.67 | 1.1 | 4 | 1 | 3 | 0.28 | 0.33 | FIRST PASS REACTION LIQUID RECORDED IN A 50% THINNING PATTERN FIRST PASS INK RECORDED IN A 50% THINNING PATTERN |
| COMPARATIVE EXAMPLE | 1 | 0.22 | 0.67 | 0.33 | 0.67 | 1 | 3 | 1.5 | 3 | 0.33 | 0.50 | |
| | 2 | 0.00 | 0.45 | 0.06 | 0.89 | 0 | 2 | 1 | 4 | 0.00 | 0.06 | SECOND PASS REACTION LIQUID RECORDED IN A 25% THINNING PATTERN |
| | 3 | 0.22 | 0.67 | 0.22 | 0.67 | 1 | 3 | 1 | 3 | 0.33 | 0.33 | |
| | 4 | 0.14 | 0.45 | 0.22 | 0.67 | 1.25 | 4 | 1 | 3 | 0.31 | 0.33 | FIRST PASS REACTION LIQUID RECORDED IN A 50% THINNING PATTERN FIRST PASS INK RECORDED IN A 50% THINNING PATTERN |
| | 5 | 0.00 | 0.45 | 0.07 | 0.89 | 0 | 2 | 0.3 | 4 | 0.00 | 0.08 | |

FIG.9

| | | STRIPES OF NON-EXPULSION PORTION | DENSITY | FEATHERING |
|---|---|---|---|---|
| EXAMPLE | 1 | ○ | ○ | ○ |
| | 2 | ○ | ○ | ○ |
| | 3 | ○ | △ | ○ |
| | 4 | ○ | ○ | △ |
| | 5 | ○ | △ | △ |
| | 6 | △ | △ | ○ |
| | 7 | △ | ○ | △ |
| | 8 | △ | △ | △ |
| | 9 | ○ | △ | △ |
| | 10 | △ | ○ | △ |
| COMPARATIVE EXAMPLE | 1 | × | ○ | ○ |
| | 2 | ○ | × | × |
| | 3 | × | ○ | ○ |
| | 4 | × | ○ | △ |
| | 5 | ○ | × | × |

LIQUID DROP EJECTING DEVICE, CONTROLLER THEREFOR, LIQUID DROP EJECTING METHOD, AND STORAGE MEDIUM STORING A PROGRAM

CROSS REFERENCE TO RELATED APPLICATION

This application claims priority under 35 USC 119 from Japanese Patent Application No. 2005-373533, the disclosure of which is incorporated by reference herein.

BACKGROUND

1. Technical Field

The present invention relates to a liquid drop ejecting device and liquid drop ejecting method which eject liquid drops (droplets) onto a recording medium by a head having liquid drop ejectors which eject liquid drops, and to a controller which controls the liquid drop ejecting device, and to a storage medium which stores a program.

2. Related Art

Inkjet printers, which have a head at which a plurality of liquid drop ejectors ejecting liquid drops are lined-up and which carry out image recording by ejecting ink drops from the liquid drop ejectors, are coming into wide use. Further, in recent years, inkjet printers have employed a two-liquid reacting system for the purposes of improving image density, improving on blurring (feathering) of ink into the sheet, shortening the drying time, and the like. This two-liquid reacting system applies onto a sheet, in addition to the inks of the respective colors, a reaction liquid (also called processing liquid) which makes components of the inks cohere, thicken, or become insoluble.

However, because the spreading of the ink liquid drop in the lateral direction lessens due to the ejection of the reaction liquid, it is easy for stripe-like image defects to become conspicuous due to non-ejection or directional bending of liquid drop ejectors of the head.

PWA (Partial Width Array) inkjet printers, which carry out printing by moving a recording sheet in a subscanning direction while scanning a recording head in a main scanning direction, can employ a multipass recording method. Therefore, variation in the ejecting characteristics of the respective nozzles of the recording head can be dispersed, and deterioration in image quality can be prevented. A multipass recording method is a method in which, by moving the recording medium by minute amounts in the direction in which the nozzles of the recording head are lined-up and scanning the recording head plural times (multipass) in the direction orthogonal to the direction in which the nozzles are lined-up, a thinned-out image is complementarily recorded in the same region of the recording medium by different nozzles groups and the image is completed.

However, in a so-called FWA (Full Width Array) inkjet printer which has an elongated recording head having substantially the same width as the width of a recording sheet and which carries out recording while keeping the recording head fixed and conveying only the recording medium, basically, the head is fixed and the recording sheet is conveyed. Therefore, such multipass printing cannot be carried out, and defects in liquid drop ejectors become particularly great problems.

SUMMARY

The present invention is made in view of the aforementioned, and provides a liquid drop ejecting device, a controller therefor, a liquid drop ejecting method and a storage medium storing a program, which can prevent the formation of stripes due to non-ejection or directional bending or the like of liquid drop ejectors, and can improve image quality.

An aspect of the present invention provides a controller that controls a liquid drop ejecting device including a first head at which a plurality of first liquid drop ejectors, which eject first liquid drops containing a coloring material, are arrayed, and a second head at which a plurality of second liquid drop ejectors, which eject second liquid drops that cause components of the first liquid drops to thicken, cohere or become insoluble, are arrayed, the controller comprising: a scanning control section that controls scanning such that, among the first head and the second head, at least the first head scans a plurality of times relative to a corresponding region of a recording medium; and an ejection control section that controls ejecting of the first head and the second head such that, among the plurality of times of scanning, a proportion of an applied amount, per unit surface area, of the second liquid drops onto the recording medium with respect to an applied amount, per unit surface area, of the first liquid drops onto the recording medium in a first scan is greater than or equal to 0 and less than or equal to a first predetermined value (first value), the proportion from a second scan on is greater than or equal to a second predetermined value (second value) and less than or equal to 1, and the proportion in the first scan is smaller than the proportion from the second scan on.

DESCRIPTION OF THE DRAWINGS

Embodiments of the present invention will be described in detail based on the following figures, wherein:

FIG. 8 is a table showing respective recording conditions of Examples 1 through 10 and Comparative Examples 1 through 5; and FIG. 9 is a table showing the evaluation of the recording results of Examples 1 through 10 and Comparative Examples 1 through 5, in a case in which double-pass recording is carried out under the recording conditions shown in FIG. 8.

DETAILED DESCRIPTION

Embodiments of the present invention will be described in detail hereinafter with reference to the drawings.

First Embodiment

Figure 1:
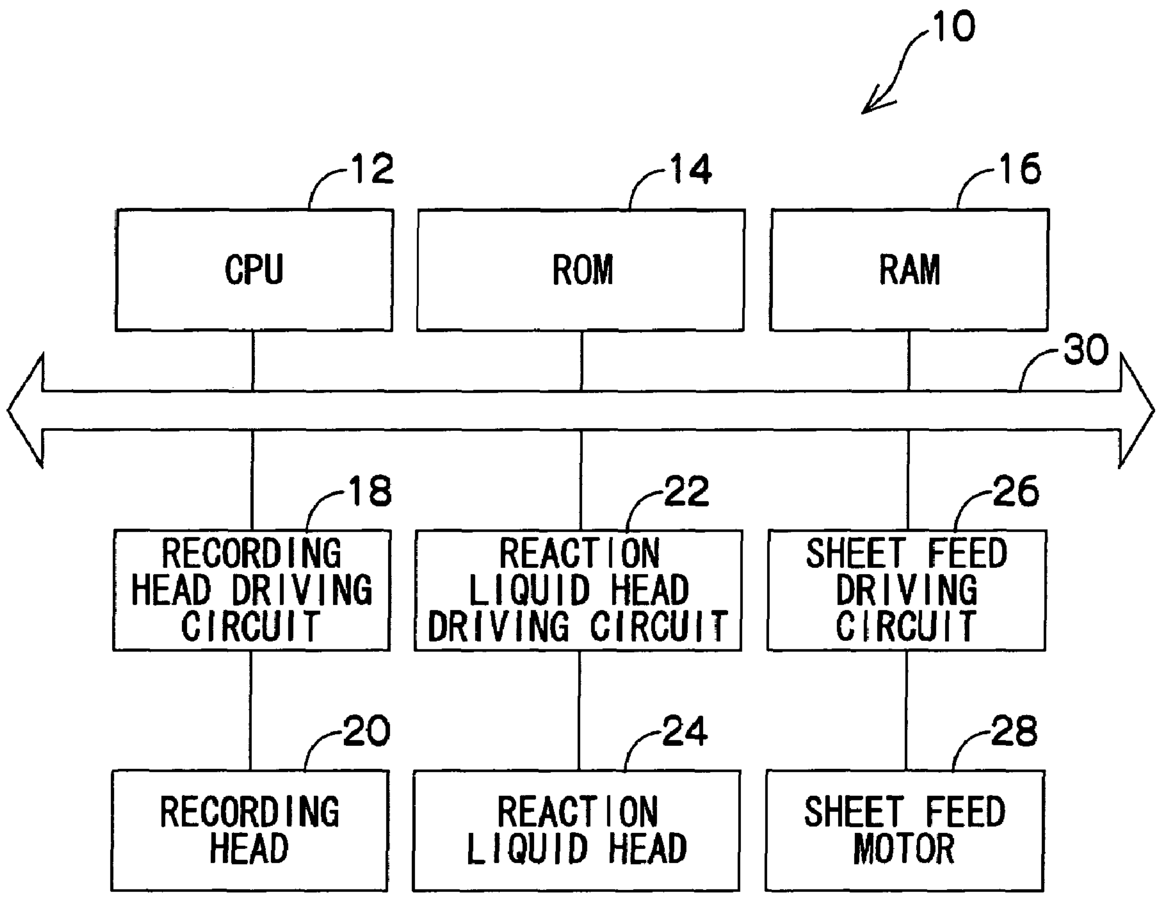
FIG. 1 is a block diagram showing the schematic structure of a liquid drop ejecting device relating to first and second embodiments.

FIG. 1 is a block diagram showing the schematic structure of a liquid drop ejecting device 10 relating to the present embodiment. The liquid drop ejecting device 10 includes a CPU 12, a ROM 14, and a RAM 16, and these are connected by a bus 30. The CPU 12 controls the operations of the respective structural sections of the liquid drop ejecting device 10. Programs of various processing routines are stored in the ROM 14. The CPU 12 carries out various types of control by executing these programs.

The liquid drop ejecting device 10 further includes a recording head 20 that ejects ink drops containing a color material; a recording head driving circuit 18 that drives the recording head 20; a reaction liquid head 24 that ejects reaction liquid that makes components in the ink drops ejected from the recording head 20 cohere, thicken, or become insoluble; a reaction liquid head driving circuit 22 that drives the reaction liquid head 24; a sheet feed motor 28 that conveys a recording sheet at the time of image formation; and a sheet feed driving circuit 26 for driving the sheet feed motor 28.

The recording head driving circuit 18 drives the recording head 20 in accordance with ink ejecting data transmitted from the CPU 12. The reaction liquid head driving circuit 22 drives the reaction liquid head 24 in accordance with reaction liquid ejecting data transmitted from the CPU 12. Further, the sheet feed driving circuit 26 drives the sheet feed motor 28 in accordance with control signals from the CPU 12.

The recording head 20 is an FWA head which has a recording region corresponding to the maximum width of recording sheets, and which is structured such that a plurality of liquid drop ejectors 50 (see FIG. 2B or FIG. 2D) which eject ink drops are lined-up in a direction orthogonal to a sheet conveying direction at a head bar (not shown) of a length corresponding to the width of a recording sheet. The liquid drop ejecting device 10 can eject liquid drops onto the entire width of a recording sheet by carrying out recording while conveying only the recording sheet with the recording head 20 fixed as is.

Figure 2A:
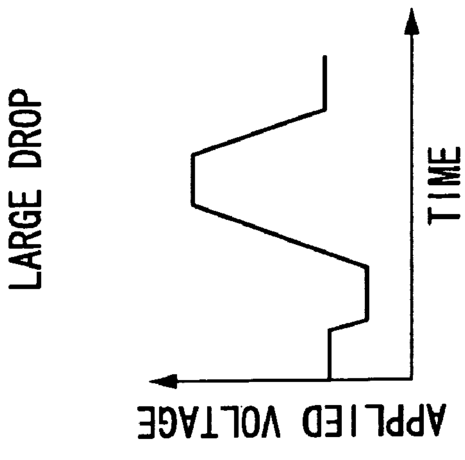
FIGS. 2A through 2D are diagrams schematically explaining the structure of a liquid drop ejector, the driving waveform of voltage applied to a piezoelectric element of the liquid drop ejector, and the size of a dot ejected in accordance with the driving waveform.
Figure 2B:
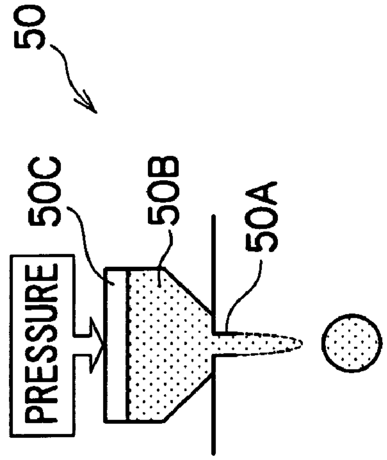
Figure 2C:
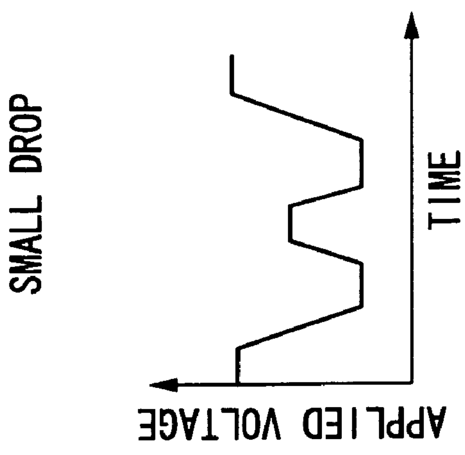
Figure 2D:
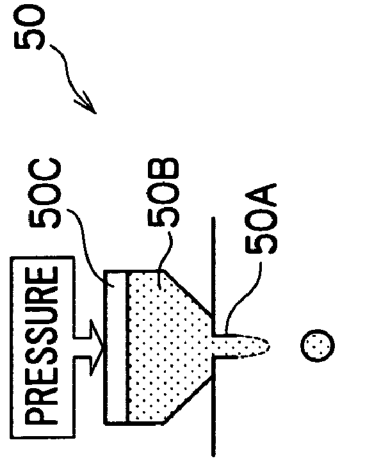

As shown in FIGS. 2B and 2D, the liquid drop ejector 50 is structured to include a nozzle 50A for ejecting ink drops, a liquid drop pressure chamber 50B communicating with the nozzle 50A, and a piezoelectric element 50C provided so as to contact the liquid drop pressure chamber 50B. As is known, the piezoelectric element 50C has the property that the shape thereof changes due to the application of voltage thereto. By using this change in shape, the piezoelectric element 50C applies pressure to the interior of the liquid drop pressure chamber 50B, an ink drop is ejected from the nozzle 50A, and a dot is recorded on the recording sheet.

The liquid drop ejecting device 10 is structured as a device which is capable of not only two-gradation recording of "with drop/no drop", but also of multiple-gradation recording which records by varying the dot size of the ink drop (the drop amount is the amount per drop) such as a small drop and a large drop. Specifically, the driving waveform applied to the piezoelectric element 50C is controlled as shown in FIGS. 2A and 2C. In this way, for example, a large ink drop (see FIG. 2B), and a small ink drop (see FIG. 2D) can be ejected from the nozzle 50A. Note that, in a case in which no ink drop is to be ejected from the nozzle 50A (no drop), voltage of a waveform such that no dot is formed can be applied.

Because the structure of the reaction liquid head 24 is similar to that of the recording head 20, description thereof is omitted. However, the reaction liquid head 24 is disposed at the upstream side, in the conveying direction of the recording sheet, of the recording head 20. Thus, the liquid drops are always ejected onto the recording sheet in the order of the reaction liquid drops first and then the ink drops.

Operation of the liquid drop ejecting device 10 will be described next.

Figure 3:
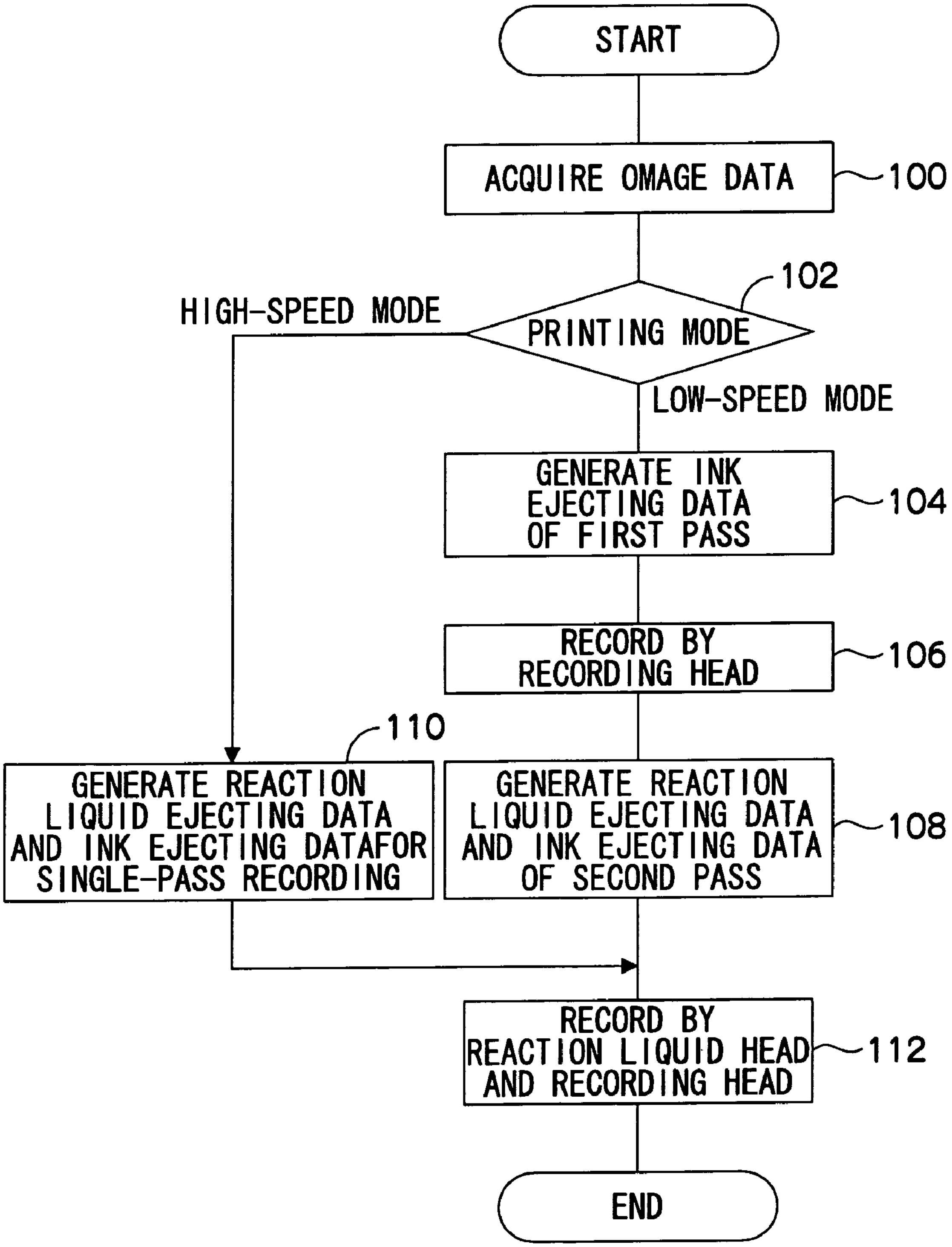
FIG. 3 is a flowchart of a program of a printing processing routine executed in the first embodiment.

FIG. 3 is a flowchart of a program of a printing processing routine which is started-up at the time when a print command is inputted from the exterior, and is executed by the CPU 12. Note that, in the liquid drop ejecting device 10, when a printing mode is a high-speed mode, an image is recorded by scanning a recording sheet one time by the recording head 20 (single-pass recording), and when the printing mode is a low-speed mode, an image is recorded by complementarily scanning the same region of the recording sheet two times by the recording head 20 (double-pass recording).

In step 100, image data is acquired. In step 102, it is judged whether the printing mode which is designated by the print command is the high-speed mode or the low-speed mode. The high-speed mode is a mode in which printing is carried out at a relatively high speed, e.g., a single-side printing mode, a standard image quality mode, or the like. The low-speed mode is a mode in which printing is carried out at a relatively low speed, e.g., a high image quality mode, a double-sided printing mode, or the like.

In a case in which the designated printing mode is judged in step 102 to be the low-speed mode, double-pass recording operation is carried out. To this end, in step 104, first, ink ejecting data for the scanning of the first time (the first pass) is generated on the basis of the acquired image data. Note that, in the present embodiment, in the first pass, only ink drops are ejected, and the reaction liquid is not ejected. (Namely, the proportion of the applied amount, per unit surface area, of the reaction liquid drops onto the recording sheet with respect to the applied amount, per unit surface area, of the ink drops onto the recording sheet, is zero.) Therefore, only ink ejecting data is generated. At this time, the ink ejecting data of the first pass is generated such that the dot size (the drop amount) is such that the applied amount, per unit surface area, of the ink drops of the first pass onto the recording sheet is smaller than the applied amount, per unit surface area, of the ink drops of the second pass onto the recording sheet. Namely, the dot size of the first pass is made to be smaller than the dot size of the second pass. Note that the dot size of the first pass and the dot size of the second pass are set in advance by experimentation or the like to become suitable values.

In step 106, the generated ink ejecting data of the first pass is outputted to the recording head driving circuit 18, a control signal for sheet conveying is outputted to the sheet feed driving circuit 26, and recording of the first pass is carried out.

In step 108, the ink ejecting data and the reaction liquid ejecting data of the second pass are generated on the basis of the acquired image data. The ink ejecting data is generated such that the dot size is such that the applied amount, per unit surface area, of the ink drops of the second pass is greater than the applied amount, per unit surface area, of the ink drops of the first pass. Further, it is preferable that the reaction liquid ejecting data be generated such that the proportion of the applied amount, per unit surface area, of the reaction liquid drops with respect to the applied amount, per unit surface area, of the ink drops of the second pass, is greater than or equal to 0.1 and less than or equal to 1. Note that, for this proportion as well, a suitable value is determined by experimentation or the like and is set in advance.

In step 112, the generated ink ejecting data of the second pass is outputted to the recording head driving circuit 18, and the generated reaction liquid ejecting data is outputted to the reaction liquid head driving circuit 22. Further, by outputting a control signal to the sheet feed driving circuit 26 to either return or convey again the recording sheet along the same route, recording is carried out such that the data of the second pass is recorded in the same region of the recording sheet as the region which was recorded in the first pass. Note that, as described above, the reaction liquid head 24 is disposed at the upstream side, in the recording sheet conveying direction, of the recording head 20. Therefore, the liquid drops are always ejected onto the recording sheet in the order of the reaction liquid and then the ink drops.

On the other hand, in a case in which it is judged in step 102 that the designated printing mode is the high-speed mode, single-pass recording operation is carried out. To this end, in step 110, ink ejecting data, by which the image is formed completely in one scan, and reaction liquid ejecting data, which is such that the reaction liquid applied amount is of a predetermined proportion with respect to the ink drop applied amount, are generated. Then, in step 112, the generated ink ejecting data and reaction liquid ejecting data are outputted to the recording head driving circuit 18 and the reaction liquid head driving circuit 22, the sheet feed driving circuit 26 is controlled to convey the recording sheet, and the image is recorded in one scan.

Here, the concrete liquid drop ejecting operation will be described with reference to FIGS. 4, 5A and 5B.

Figure 4:
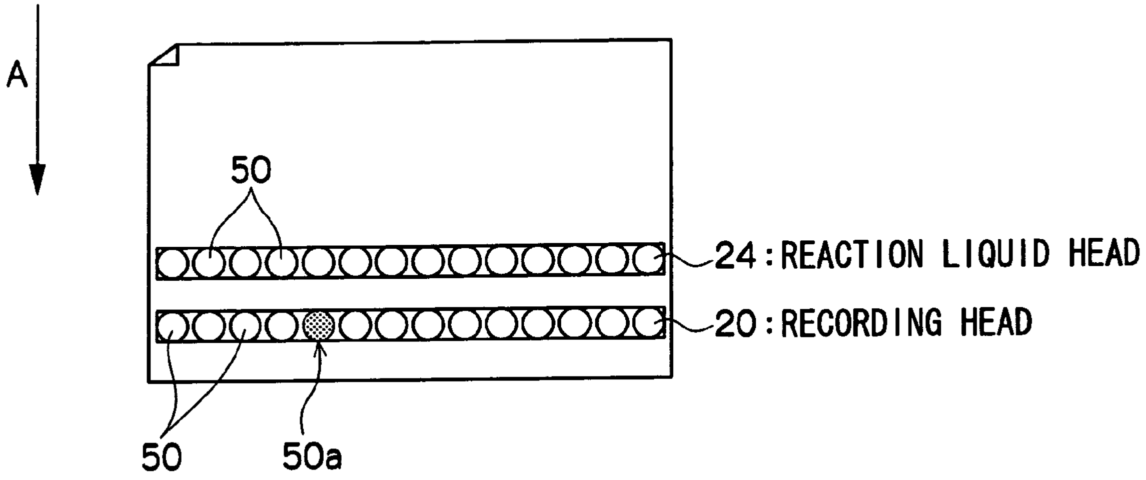
FIG. 4 is a diagram showing an arrangement of a recording head and a reaction liquid head with respect to a recording sheet.

FIG. 4 is a diagram showing the arrangement of the recording head 20 and the reaction liquid head 24 with respect to the recording sheet. As shown in FIG. 4, the reaction liquid head 24 is disposed at the upstream side of the recording head 20 in the sheet conveying direction (arrow A in the drawing). Here, the recording head 20, which includes one defective ejector 50*a* which does not eject ink drops, is shown as an example. Conventionally, because single-pass recording is carried out in the FWA method, a white stripe arises at the defective ejector 50*a* portion. However, in the present embodiment, because double-pass recording is carried out as described above, the formation of a white stripe can be suppressed.

Figure 5A:
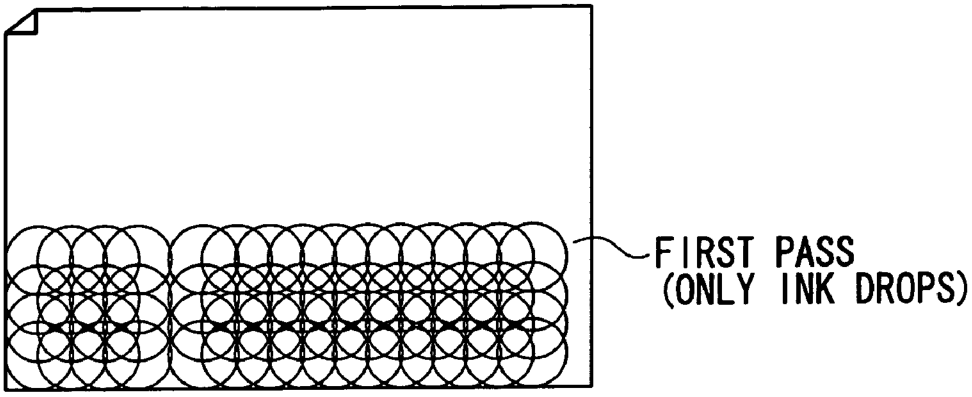
FIG. 5A is a diagram explaining an ejected state of ink drops of a first pass of the first embodiment.

First, in the first pass, the heads 20 and 24 are controlled out such that only ink drops are ejected and reaction liquid drops are not ejected, as shown in FIG. 5A. At this time, no ink drops are ejected from the defective ejector 50*a*. However, because reaction liquid drops are not ejected in the first pass, the ink drops ejected from the ejectors 50 adjacent to the defective ejector 50*a* spread to the non-ejection portion, without components in the ink drops being made to cohere, thicken or become insoluble. Therefore, the stripe becomes inconspicuous. Further, because the applied amount, per unit surface area, of the ink drops in the first pass is small as compared with that in the second pass, drying is quick as well.

Figure 5B:
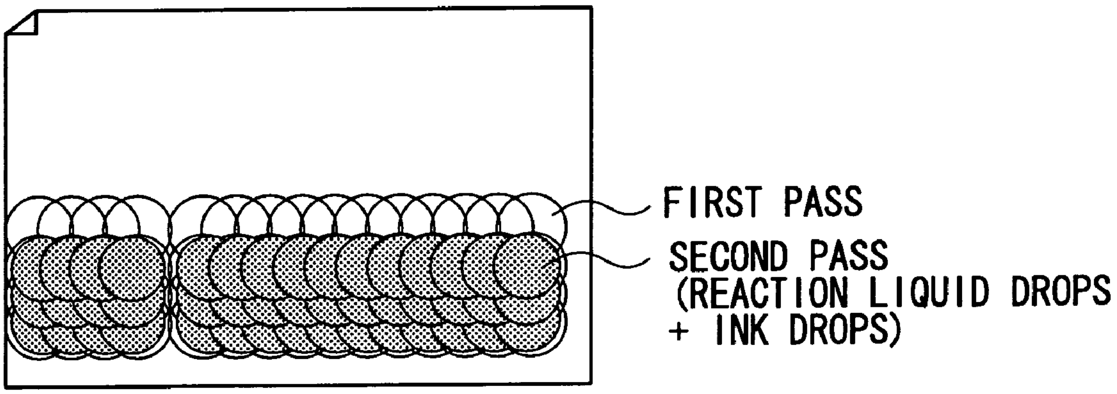
FIG. 5B is a diagram explaining an ejected state of ink drops and reaction liquid drops of a second pass.

Next, as shown in FIG. 5B, both the reaction liquid drops and the ink drops are ejected in the second pass. Because not only ink drops but reaction liquid as well are ejected in the second pass, the image quality is improved with respect to density and feathering and the like.

By carrying out double-pass recording in this way, it is possible to make stripes inconspicuous, and the image quality can be improved. Further, if the applied amount and/or applied proportion, per unit surface area, of the ink drops are too large in the first pass in which reaction liquid drops are not ejected, the image quality deteriorates with respect to density and feathering. However, here, the applied amount and/or applied proportion, per unit surface area, of ink drops in the first pass are made to be less than in the second pass, and the applied amount and applied proportion are made to be large in the second pass in which the reaction liquid drops are ejected. Therefore, the image quality can be improved.

Note that, here, description is given in which the defective ejector 50*a* is an ejector which does not eject ink drops. However, the same effects are achieved even if the defective ejector is an ejector whose direction of ejecting ink drops is bent, or an ejector whose ejecting amount is low.

Further, surface tensions of the ink and the reaction liquid used in image recording which are low to a certain extent are preferable (e.g., 25 to 35 mN/m). In this way, the ink drops which are applied onto the recording sheet in the first pass spread easily.

Second Embodiment

In the present embodiment, an example is described in which, in the case of double-pass recording, double-pass recording is carried out in a region drawn by liquid drop ejectors which are lined-up within a predetermined range which includes a defective ejector, and single-pass recording is carried out in regions drawn by the liquid drop ejectors other than in this range.

Because the structures of the liquid drop ejecting device 10 and the liquid drop ejector 50 of the present embodiment are similar to those of the first embodiment, description thereof is omitted.

Figure 6:
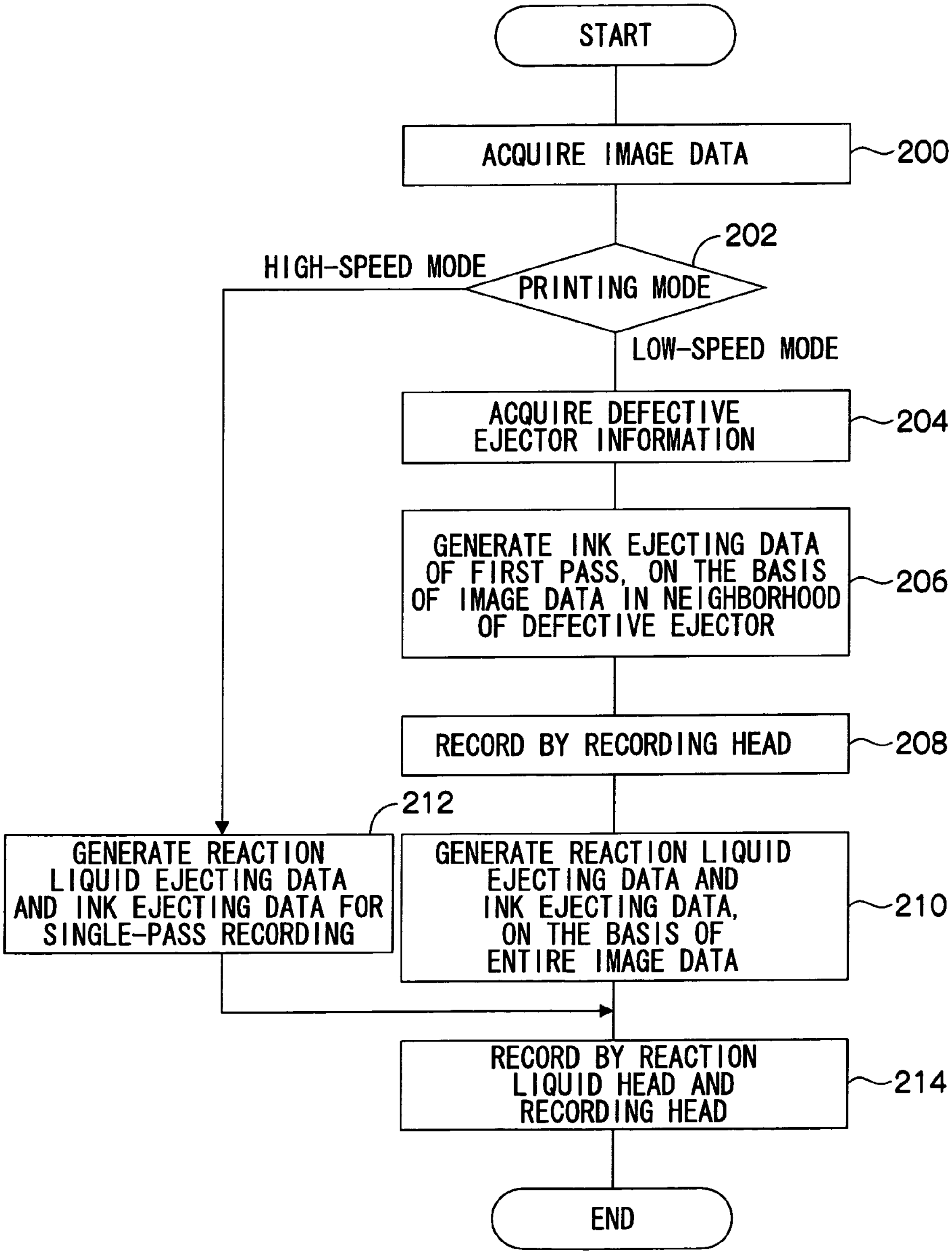
FIG. 6 is a flowchart of a program of a printing processing routine executed in the second embodiment.

FIG. 6 is a flowchart of a program of a printing processing routine in the present embodiment. This program also is started-up at the time when a print command is inputted from the exterior.

In step 200, image data is acquired. In step 202, it is judged whether the printing mode designated in the print command is the high-speed mode or the low-speed mode. Here, when it is judged that the designated printing mode is the low-speed mode, double-pass recording operation is carried out. To this end, in step 204, first, defective ejector information is acquired. This defective ejector information is information indicating the position of a defective ejector included in the recording head 20. Defective ejector information may be recorded in the ROM 14 or the like at the time when the recording head 20 is installed in the liquid drop ejecting device 10. Or, a storage section which stores defective ejector information may be provided at the recording head 20, and the recording head driving circuit 18 may read-out the defective ejector information from this storage section. At the time of manufacturing the recording head 20 or before shipping-out the recording head 20 as a product, an ejecting inspection is carried out. Liquid drop ejectors whose ejecting amounts or ejecting directions are markedly far from design values are considered to be defective ejectors, and positional information thereof is recorded as the defective ejector information.

In step 204, ink ejecting data of the first pass is generated for a region (hereinafter, "non-ejection region") drawn by the liquid drop ejectors 50 which are disposed within a predetermined range which includes a defective ejector. In the present embodiment as well, the ink ejecting data of the first pass is generated such that the dot size (the drop amount) is such that the applied amount, per unit surface area, of the ink drops of the first pass onto the recording sheet is smaller than the applied amount, per unit surface area, of the ink drops of the second pass onto the recording sheet.

In step 208, the generated ink ejecting data of the first pass is outputted to the recording head driving circuit 18, a control signal for sheet conveying is outputted to the sheet feed driving circuit 26, and image recording is carried out by ejecting ink drops from only the liquid drop ejectors 50 which are disposed within the predetermined range which includes the defective ejector.

In step 210, the ink ejecting data and the reaction liquid ejecting data of the second pass are generated for the entire region.

At this time, double-pass recording is carried out on the non-ejection region. To this end, the ink ejecting data is generated such that the dot size is such that the applied amount, per unit surface area, of the ink drops of the second pass is greater than the applied amount, per unit surface area, of the ink drops of the first pass. Further, the reaction liquid ejecting data is generated such that the proportion of the applied amount, per unit surface area, of the reaction liquid drops with respect to the applied amount, per unit surface area, of the ink drops of the second pass, is greater than or equal to 0.1 and less than or equal to 1.

For regions other than the non-ejection region, single-pass recording is carried out only in the second pass. To this end, ink ejecting data which is such that the image is completed in one scan, and reaction liquid ejecting data which is such that the reaction liquid applied amount is of predetermined proportion with respect to the ink drop applied amount, are generated.

In step 214, the generated ink ejecting data of the second pass is outputted to the recording head driving circuit 18, and the generated reaction liquid ejecting data is outputted to the reaction liquid head driving circuit 22. Further, a control signal is outputted to the sheet feed driving circuit 26, and the recording sheet is either returned or is conveyed again along the same route. In this way, at the non-ejection region, the image is recorded complementarily in the first pass and the second pass, and in regions other than the non-ejection region, the complete image is recorded only in the second pass. Note that, as described above, the reaction liquid head 24 is disposed at the upstream side, in the recording sheet conveying direction, of the recording head 20. Therefore, the liquid drops are always ejected onto the recording sheet in the order of the reaction liquid and then the ink drops.

On the other hand, in a case in which it is judged in step 202 that the designated printing mode is the high-speed mode, single-pass recording operation is carried out by all of the liquid drop ejectors 50. To this end, in step 212, ink ejecting data, which is such that the image is formed completely in one scan, and reaction liquid ejecting data, which is such that there is a reaction liquid applied amount of a predetermined proportion with respect to the ink drop applied amount, are generated. Then, in step 214, the generated ink ejecting data and reaction liquid ejecting data are outputted to the recording head driving circuit 18 and the reaction liquid head driving circuit 22, the sheet feed driving circuit 26 is controlled such that the recording sheet is conveyed, and the image is recorded in one scan.

Here, the concrete liquid drop ejecting operation will be described with reference to FIGS. 4, 7A and 7B.

In the present embodiment as well, as shown in FIG. 4, it is assumed that one of the defective ejectors 50*a* which does not eject ink drops is included in the recording head 20.

Figure 7A:
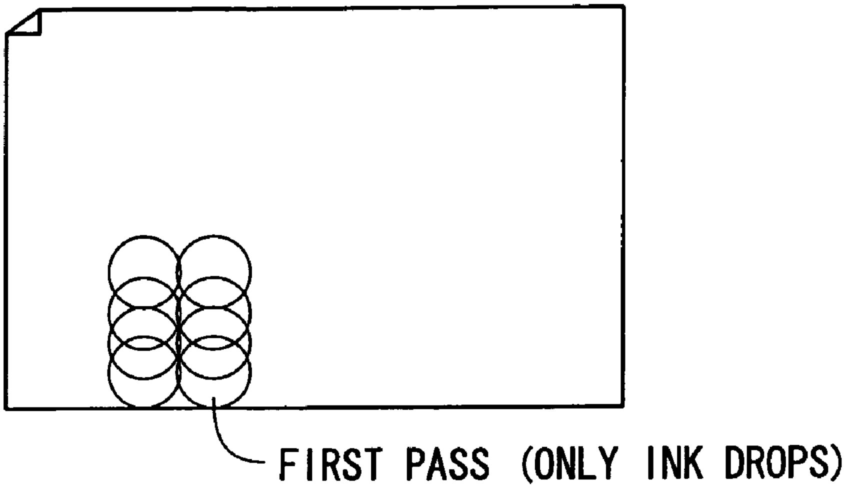
FIG. 7A is a diagram explaining an ejected state of ink drops of a first pass of the second embodiment.

First, as shown in FIG. 7A, in the first pass, control is carried out such that only ink drops are ejected by the liquid drop ejectors 50 within the predetermined range which includes the defective ejector 50*a*, and reaction liquid drops are not ejected. At this time, no ink drops are ejected from the defective ejector 50*a*. However, because reaction liquid drops are not ejected in the first pass, the ink drops ejected from the ejectors 50 adjacent to the defective ejector 50*a* spread to the non-ejection portion, without components in the ink drops being made to cohere, thicken or become insoluble. Therefore, the stripe becomes inconspicuous. Further, because the applied amount, per unit surface area, of the ink drops in the first pass is small as compared with that in the second pass, drying is quick as well.

Figure 7B:
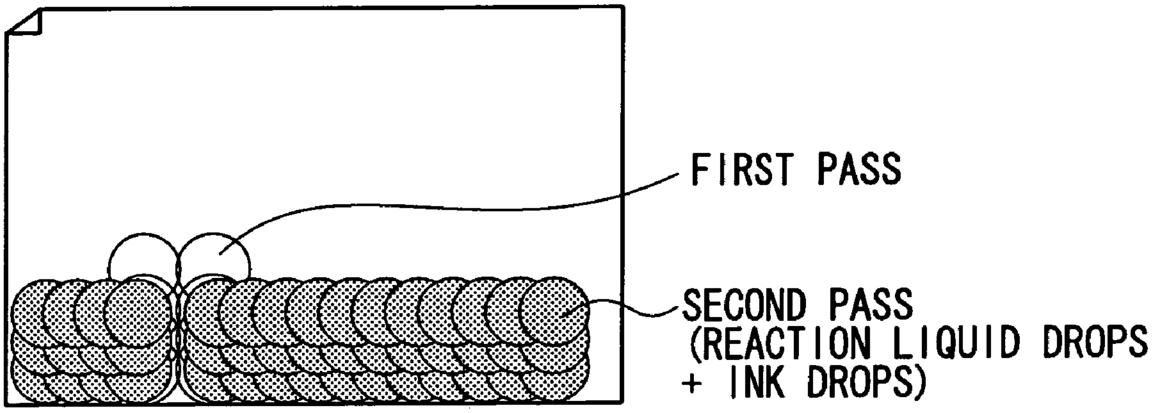
FIG. 7B is a diagram explaining an ejected state of ink drops and reaction liquid drops of a second pass.

Next, as shown in FIG. 7B, in the second pass, both the reaction liquid drops and the ink drops are ejected. Not only ink drops but the reaction liquid as well are ejected in the second pass. Therefore, the image quality is improved with respect to density and feathering and the like.

By carrying out double-pass recording in the non-ejection region in this way, in the same way as in the first embodiment, it is possible to make stripes inconspicuous, and the image quality can be improved. Note that, here, description is given in which the defective ejector 50*a* is an ejector which does not eject ink drops. However, the same effects are achieved even if the defective ejector is an ejector whose direction of ejecting ink drops is bent, or an ejector whose ejecting amount is low.

The present embodiment describes an example of carrying out double-pass recording at a region which is drawn by liquid drop ejectors 50 within a predetermined range which includes a defective ejector 50*a*. However, the present invention is not limited to the same. For example, double-pass recording may be carried out at a region where a solid image or a halftone image of a predetermined size or greater is to be formed. This is because, although stripes are not conspicuous in an image which is drawn by lines such as characters or line drawings, it is easy for stripes to be conspicuous in solid images and halftone images, and in particular, in solid images and halftone images having a large surface area to a certain extent. If double-pass recording is carried out in such a region, the formation of stripes is suppressed and image quality improves.

The above first and second embodiments describe, as examples, cases in which the reaction liquid drops are not ejected in the first pass. However, the present invention is not limited to the same, and reaction liquid drops may be ejected in the first pass. At this time, the ink ejecting data and the reaction liquid ejecting data are generated such that the proportion of the applied amount, per unit surface area, of the reaction liquid drops with respect to the applied amount, per unit surface area, of the ink drops of the first pass, is smaller than that proportion in the second pass. For this reason as well, the reaction liquid drops are applied in a small amount in the first pass. Thus, in the first pass, the ink drops spread, and stripes at the defective portions can be made to be inconspicuous. Note that, at this time, it is preferable that the proportion of the applied amount, per unit surface area, of the reaction liquid with respect to the applied amount, per unit surface area, of the ink drops of the first pass, is less than or equal to 0.3.

Further, in the above-described first and second embodiments, by adjusting the dot size (drop amount), control is carried out such that the proportion of the applied amount, per unit surface area, of the reaction liquid drops to the applied amount, per unit surface area, of the ink drops of the first pass, is made to be less than the proportion of the applied amount, per unit surface area, of the reaction liquid drops to the applied amount, per unit surface area, of the ink drops of the second pass. However, rather than by adjusting the drop amounts, control can be carried out by carrying out thinning and adjusting the print rate. In the case of thinning, it is preferable to generate the ink ejecting data such that data of the second pass is recorded complementarily onto the same region of the recording sheet as the region recorded in the first pass.

Further, the aforementioned proportions may be controlled by adjusting both the print rate and the drop amounts.

Moreover, the first and second embodiments provide description regarding an FWA liquid drop ejecting device.

However, the present invention is not limited to the same, and can be applied to a PWA liquid drop ejecting device.

In the PWA method, general multipass recording can be carried out. At this time as well, in the same way as in the above-described case of the FWA method, in the first pass, only the ink drops are ejected and the reaction liquid drops are not ejected, and from the second pass on, the reaction liquid drops and the ink drops are ejected. In the same way as in the above-described embodiments, the order of ejecting is such that the reaction liquid drops are ejected, and thereafter, the ink drops are ejected. Note that, if there is a small amount, the reaction liquid drops may be ejected in the first pass. In this way, even in the PWA method, defects in image quality can be handled, and recording of a higher quality is possible.

The first and second embodiments describe, as examples, cases of recording an image in a single color. However, even when recording in color, processing can be carried out by using the same line of thinking as in the above-described embodiments.

Specifically, in cases of secondary colors which are recorded by superposing ink drops of two different colors, and in cases of tertiary colors which are recorded by superposing ink drops of three different colors, for each of the colors, in the first pass, only the ink drops are ejected and the reaction liquid drops are not ejected. From the second pass on, the reaction liquid drops and the ink drops are ejected. In the same way as in the above-described embodiments, the order of ejecting is such that the reaction liquid drops are ejected, and thereafter, the ink drops are ejected. Further, in the same way as described above, reaction liquid drops may be ejected in the first pass as well.

In the above-described first and second embodiments, the recording operation is made to differ (single-pass recording or double-pass recording is carried out) in accordance with the printing mode. However, it is possible to always carry out double-pass recording.

Moreover, in the above-described first and second embodiments, the double-pass recording operation is executed by the liquid drop ejecting device 10 as a unit. However, the double-pass recording operation of the liquid drop ejecting device 10 may be controlled by control signals, which control scanning, and ink ejecting data and reaction liquid ejecting data being outputted to the liquid drop ejecting device 10 from an external controller having functions which control the sheet feed driving circuit 26 such that the same region of the recording sheet is scanned twice at the recording head 20, and which generate the ink ejecting data and the reaction liquid ejecting data used in ejecting the ink drops and the reaction liquid drops of the first pass and the second pass from the recording head 20 and the reaction liquid head 24. Effects which are similar to those described above are achieved by such a structure as well.

The first and second embodiments describe examples of carrying out double-pass recording, but the image may be recorded by scanning by three passes or more. In such cases as well, in the same way as in the above-described first and second embodiments, the following suffices: in the first pass, the reaction liquid drops are not ejected, or a small amount of the reaction liquid drops as compared with the second pass are ejected. From the second pass on, the applied amount per unit surface area is made to be greater than in the first pass, and the reaction liquid and the ink drops are ejected. In this way, the formation of stripes is suppressed, and image quality improves.

EXAMPLES

More concrete explanation will be given hereinafter with reference to Examples. However, the present invention is not limited to these Examples. In the respective Examples and Comparative Examples hereinafter, double-pass recording is carried out at a resolution of 1200×1200 dpi by using a recording head whose nozzle interval is 1200 npi and which includes one non-ejecting ejector (non-ejecting nozzle), and recording evaluation is carried out. C2 paper manufactured by Fuji Xerox Office Supply Co., Ltd. is used as the recording medium. The compositions of the ink and the reaction liquid used in the respective Examples and Comparative Examples are as follows.

| (Composition of Ink) | |
|---|---|
| Cabojet-300 (manufactured by Cabot Corporation) (self-dispersing pigment/carboxylic acid radical) | 4% by mass |
| Styrene - acrylic acid - sodium acrylate copolymer | 0.5% by mass |
| Diethylene glycol | 15% by mass |
| Glycerine | 5% by mass |
| Urea | 5% by mass |
| Acetyleneglycol ethylene oxide adduct | 1% by mass |
| Ion-exchanged water | Remainder |

Note that the surface tension of the ink is 31.4 mN/m.

| (Composition of Reaction Liquid) | |
|---|---|
| Diethylene glycol | 30% by mass |
| 2-Furancarboxylic acid (pKa = 2.4) | 4% by mass |
| Magnesium nitrate 6-hydrate | 0.11% by mass |
| Sodium hydroxide | 0.75% by mass |
| Acetyleneglycol ethylene oxide adduct | 1% by mass |
| Ion-exchanged water | Remainder |

Note that the surface tension of this liquid is 31.0 mN/m.

(Recording Conditions of Examples 1 through 10, Comparative Examples 1 through 5)

FIG. 8 is a table showing the recording conditions of Examples 1 through 10 and Comparative Examples 1 through 5. The recording conditions of the respective Examples and Comparative Examples will be described in detail hereinafter.

Example 1

First Pass: For the reaction liquid, by making the drop amount (DR1st.) be 0 [pl], the first pass is recorded at an applied amount (R1st.), per unit surface area, of 0.00 [mg/cm$^2$]. Further, for the ink drops, by making the drop amount (DI1st.) be 2 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.00.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.33.

Example 2

First Pass: For the reaction liquid, by using a thinning pattern of a print rate of 25% and making the drop amount (DR1st.) be 1 [pl], the first pass is recorded at an applied amount (R1st.), per unit surface area, of 0.06 [mg/cm$^2$]. Further, for the ink drops, by making the drop amount (DI1st.) be 2 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.13.

Second Pass: For the reaction liquid, by making the drop amount (DR2nd.) be 1.5 [pl], the second pass is recorded at an applied amount (R2nd.), per unit surface area, of 0.33 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.50.

Example 3

First Pass: For the reaction liquid, by making the drop amount (DR1st.) be 0 [pl], the first pass is recorded at an applied amount (R1st.), per unit surface area, of 0.00 [mg/cm$^2$]. Further, for the ink drops, by making the drop amount (DI1st.) be 3 [pl], the first pass is recorded at an applied amount (I1st.), per unit surface area, of 0.67 [mg/cm$^2$]. The proportion (R1st./I1st.) of the applied amount, per unit surface area, of the reaction liquid drops with respect to the applied amount, per unit surface area, of the ink drops of the first pass, is 0.00.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by using a thinning pattern of a print rate of 50% and making the drop amount (DI2nd.) be 4 [pl], the second pass is recorded at an applied amount (I2nd.), per unit surface area, of 0.45 [mg/cm$^2$]. The proportion (R2nd./I2nd.) of the applied amount, per unit surface area, of the reaction liquid drops with respect to the applied amount, per unit surface area, of the ink drops of the second pass, is 0.50.

Example 4

First Pass: For the reaction liquid, by making the drop amount (DR1st.) be 0 [pl], the first pass is recorded at an applied amount (R1st.), per unit surface area, of 0.00 [mg/cm$^2$]. Further, for the ink drops, by using a thinning pattern of a print rate of 50% and making the drop amount (DI1st.) be 4 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.00.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.33.

Example 5

First Pass: For the reaction liquid, by making the drop amount (DR1st.) be 0 [pl], the first pass is recorded at an applied amount (R1st.), per unit surface area, of 0.00 [mg/cm$^2$]. Further, for the ink drops, by making the drop amount (DI1st.) be 4 [pl], the first pass is recorded at an applied amount (I1st.), per unit surface area, of 0.89 [mg/cm$^2$]. The proportion (R1st./I1st.) of the applied amount, per unit surface area, of the reaction liquid drops with respect to the applied amount, per unit surface area, of the ink drops of the first pass, is 0.00.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.33.

Example 6

First Pass: For the reaction liquid, by using a thinning pattern of a print rate of 25% and making the drop amount (DR1st.) be 2 [pl], the first pass is recorded at an applied amount (R1st.), per unit surface area, of 0.11 [mg/cm$^2$]. Further, for the ink drops, by making the drop amount (DI1st.) be 3 [pl], the first pass is recorded at an applied amount (I1st.), per unit surface area, of 0.67 [mg/cm$^2$]. The proportion (R1st./I$^1$st.) of the applied amount, per unit surface area, of the reaction liquid drops with respect to the applied amount, per unit surface area, of the ink drops of the first pass, is 0.17.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by using a thinning pattern of a print rate of 70% and by making the drop amount (DI2nd.) be 4 [pl], the second pass is recorded at an applied amount (I2nd.), per unit surface area, of 0.62 [mg/cm$^2$]. The proportion (R2nd./I2nd.) of the applied amount, per unit surface area, of the reaction liquid drops with respect to the applied amount, per unit surface area, of the ink drops of the second pass, is 0.36.

Example 7

First Pass: For the reaction liquid, by using a thinning pattern of a print rate of 25% and making the drop amount (DR1st.) be 1 [pl], the first pass is recorded at an applied amount (R1st.), per unit surface area, of 0.06 [mg/cm$^2$]. Further, for the ink drops, by using a thinning pattern of a print rate of 75% and making the drop amount (DI1st.) be 3 [pl], the first pass is recorded at an applied amount (I1st.), per unit surface area, of 0.50 [mg/cm$^2$]. The proportion (R1st./I1st.) of the applied amount, per unit surface area, of the reaction liquid drops with respect to the applied amount, per unit surface area, of the ink drops of the first pass, is 0.11.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.33.

Example 8

First Pass: For the reaction liquid, by using a thinning pattern of a print rate of 25% and making the drop amount (DR1st.) be 1 [pl], the first pass is recorded at an applied amount (R1st.), per unit surface area, of 0.06 [mg/cm$^2$]. Further, for the ink drops, by making the drop amount (DI1st.) be 3 [pl], the first pass is recorded at an applied amount (I1st.), per unit surface area, of 0.67 [mg/cm$^2$]. The proportion (R1st./I1st.) of the applied amount, per unit surface area, of the reaction liquid drops with respect to the applied amount, per unit surface area, of the ink drops of the first pass, is 0.08.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.33.

Example 9

First Pass: For the reaction liquid, by making the drop amount (DR1st.) be 0 [pl], the first pass is recorded at an applied amount (R1st.), per unit surface area, of 0.00 [mg/cm$^2$]. Further, for the ink drops, by making the drop amount (DI1st.) be 2 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.00.

Second Pass: For the reaction liquid, by making the drop amount (DR2nd.) be 0.5 [pl], the second pass is recorded at an applied amount (R2nd.), per unit surface area, of 0.11 [mg/cm$^2$]. Further, for the ink drops, by making the drop amount (DI2nd.) be 4 [pl], the second pass is recorded at an applied amount (I2nd.), per unit surface area, of 0.89 [mg/cm$^2$]. The proportion (R2nd./I2nd.) of the applied amount, per unit surface area, of the reaction liquid drops with respect to the applied amount, per unit surface area, of the ink drops of the second pass, is 0.13.

Example 10

First Pass: For the reaction liquid, by using a thinning pattern of a print rate of 50% and making the drop amount (DR1st.) be 1.1 [pl], the first pass is recorded at an applied amount (R1st.), per unit surface area, of 0.13 [mg/cm$^2$]. Further, for the ink drops, by using a thinning pattern of a print rate of 50% and making the drop amount (DI1st.) be 4 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.28.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.33.

Comparative Example 1

First Pass: For the reaction liquid, by making the drop amount (DR1st.) be 1 [pl], the first pass is recorded at an applied amount (R1st.), per unit surface area, of 0.22 [mg/cm$^2$]. Further, for the ink drops, by making the drop amount (DI1st.) be 3 [pl], the first pass is recorded at an applied amount (I1st.), per unit surface area, of 0.67 [mg/cm$^2$]. The proportion (R1st./I1st.) of the applied amount, per unit surface area, of the reaction liquid drops with respect to the applied amount, per unit surface area, of the ink drops of the first pass, is 0.33.

Second Pass: For the reaction liquid, by making the drop amount (DR2nd.) be 1.5 [pl], the second pass is recorded at an applied amount (R2nd.), per unit surface area, of 0.33 [mg/cm$^2$]. Further, for the ink drops, by making the drop amount (DI2nd.) be 3 [pl], the second pass is recorded at an applied amount (I2nd.), per unit surface area, of 0.67 [mg/cm$^2$]. The proportion (R2nd./I2nd.) of the applied amount, per unit surface area, of the reaction liquid drops with respect to the applied amount, per unit surface area, of the ink drops of the second pass, is 0.50.

Comparative Example 2

First Pass: For the reaction liquid, by making the drop amount (DR1st.) be 0 [pl], the first pass is recorded at an applied amount (R1st.), per unit surface area, of 0.00 [mg/cm$^2$]. Further, for the ink drops, by making the drop amount (DI1st.) be 2 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.00.

Second Pass: For the reaction liquid, by using a thinning pattern of a print rate of 25% and making the drop amount (DR2nd.) be 1 [pl], the second pass is recorded at an applied amount (R2nd.), per unit surface area, of 0.06 [mg/cm$^2$]. Further, for the ink drops, by making the drop amount (DI2 nd.) be 4 [pl], the second pass is recorded at an applied amount (I2 nd.), per unit surface area, of 0.89 [mg/cm$^2$]. The proportion (R2nd./I2 nd.) of the applied amount, per unit surface area, of the reaction liquid drops with respect to the applied amount, per unit surface area, of the ink drops of the second pass, is 0.06.

Comparative Example 3

First Pass: For the reaction liquid, by making the drop amount (DR1st.) be 1 [pl], the first pass is recorded at an applied amount (R1st.), per unit surface area, of 0.22 mg/cm$^2$). Further, for the ink drops, by making the drop amount (DI1st.) be 3 [pl], the first pass is recorded at an applied amount (I1st.), per unit surface area, of 0.67 [mg/cm$^2$]. The proportion (R1st./I1st.) of the applied amount, per unit surface area, of the reaction liquid drops with respect to the applied amount, per unit surface area, of the ink drops of the first pass, is 0.33.

Second Pass: The second pass is recorded under the same conditions as the first pass.

Comparative Example 4

First Pass: For the reaction liquid, by using a thinning pattern of a print rate of 50% and making the drop amount (DR1st.) be 1.25 [pl], the first pass is recorded at an applied amount (R1st.), per unit surface area, of 0.14 [mg/cm$^2$]. Further, for the ink drops, by using a thinning pattern of a print rate of 50% and making the drop amount (DI1st.) be 4 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.31.

Second Pass: For the reaction liquid, by making the drop amount (DR2nd.) be 1 [pl], the second pass is recorded at an applied amount (R2nd.), per unit surface area, of 0.22 [mg/cm$^2$]. Further, for the ink drops, by making the drop amount (DI2 nd.) be 3 [pl], the second pass is recorded at an applied amount (I2 nd.), per unit surface area, of 0.67 [mg/cm$^2$]. The proportion (R2nd./I2 nd.) of the applied amount, per unit surface area, of the reaction liquid drops with respect to the applied amount, per unit surface area, of the ink drops of the second pass, is 0.33.

Comparative Example 5

First Pass: For the reaction liquid, by making the drop amount (DR1st.) be 0 [pl], the first pass is recorded at an applied amount (R1st.), per unit surface area, of 0.00 [mg/cm$^2$]. Further, for the ink drops, by making the drop amount (DI1st.) be 2 [pl], the first pass is recorded at an applied amount (I1st.), per unit surface area, of 0.45 [mg/cm$^2$]. The proportion (R1st./I1st.) of the applied amount, per unit surface area, of the reaction liquid drops with respect to the applied amount, per unit surface area, of the ink drops of the first pass, is 0.00.

Second Pass: For the reaction liquid, by making the drop amount (DR2nd.) be 0.3 [pl], the second pass is recorded at an applied amount (R2nd.), per unit surface area, of 0.07 [mg/cm$^2$]. Further, for the ink drops, by making the drop amount (DI2 nd.) be 4 [pl], the second pass is recorded at an applied amount (I2 nd.), per unit surface area, of 0.89 [mg/cm$^2$]. The proportion (R2nd./I2 nd.) of the applied amount, per unit surface area, of the reaction liquid drops with respect to the applied amount, per unit surface area, of the ink drops of the second pass, is 0.08.

(Evaluation)

FIG. 9 is a table showing the evaluation of the respective recording results of Examples 1 through 10 and Comparative Examples 1 through 5. Here, the three items of stripes of the non-ejection portion, density, and the state of the occurrence of feathering were visually observed and evaluated. The standards for evaluation are as follows, where ○ and Δ are allowable levels.

[Stripes of Non-Ejection Portion]

○: improved to the extent that stripes cannot be seen

Δ: stripes can be seen but are not overly conspicuous

×: stripes are conspicuous

[Density]

○: good density and color tone are obtained

Δ: density and color tone are acceptable levels

×: density and color tone worse than acceptable levels

[Feathering]

○: little blurring

Δ: blurring occurs, but is an acceptable level

×: blurring worse than acceptable level

As can be understood from FIG. 9, the results of recording of Examples 1 through 10 received a good evaluation with respect to the three items of stripes of the non-ejection portion, density, and the state of the occurrence of feathering.

Further, Comparative Examples 1, 3, 4 did not have good results with respect to improving on stripes of the non-ejection portion. Comparative Examples 2, 5 did not have good results with respect to density and feathering. It can be understood from Example 9 and Comparative Example 5 that, when the proportion of the applied amount, per unit surface area, of reaction liquid drops with respect to the applied amount, per unit surface area, of the ink drops of the second pass is greater than or equal to 0.1, good density and color tone are obtained and there is little blurring. Further, it can be understood from Example 10 and Comparative Example 4 that, when the proportion of the applied amount, per unit surface area, of reaction liquid drops with respect to the applied amount, per unit surface area, of the ink drops of the first pass is less than or equal to 0.3, there is improvement with respect to the stripes of the non-ejection portion.

As described above, the present invention provides a controller that controls a liquid drop ejecting device including a first head at which a plurality of first liquid drop ejectors, which eject first liquid drops containing a coloring material, are arrayed, and a second head at which a plurality of second liquid drop ejectors, which eject second liquid drops that cause components of the first liquid drops to thicken, cohere or become insoluble, are arrayed, the controller comprising: a scanning control section that controls scanning such that, among the first head and the second head, at least the first head scans a plurality of times relative to a corresponding region of a recording medium; and an ejection control section that controls ejecting of the first head and the second head such that, among the plurality of times of scanning, a proportion of an applied amount, per unit surface area, of the second liquid drops onto the recording medium with respect to an applied amount, per unit surface area, of the first liquid drops onto the recording medium in a first scan is greater than or equal to 0 and less than or equal to a first value, the proportion from a second scan on is greater than or equal to a second value and less than or equal to 1, and the proportion in the first scan is smaller than the proportion from the second scan on.

In the controller, the scanning controlling section effects control such that scanning is carried out plural times relatively with respect to the same region of the recording medium by at least the first head. For example, the head may be moved with respect to the recording medium, or the recording medium may be moved with respect to the head, or the both may be moved.

If the second liquid drops are ejected not only in the scans from the second scan on but also in the first scan as well, the scanning controlling section effects control such that scanning is carried out plural times relatively with respect to the same region of the recording medium by the first head and the second head. Further, if the second liquid drops are ejected only in the scans from the second scan on (i.e., the proportion of the applied amount, per unit surface area, of the second liquid drops onto the recording medium with respect to the applied amount, per unit surface area, of the first liquid drops onto the recording medium is 0), control is carried out such that scanning is carried out plural times relatively with respect to the same region of the recording medium by only the first head.

The ejection controlling section controls the ejecting of the first head and the second head such that the proportion of an applied amount, per unit surface area, of the second liquid drops onto the recording medium with respect to an applied amount, per unit surface area, of the first liquid drops onto the recording medium in the first scan, is greater than or equal to 0 and less than or equal to a first value (first range), and this proportion in scans from the second scan on is greater than or equal to a second value and less than or equal to 1 (second range), and this proportion in the first scan is smaller than this proportion in scans from the second scan on.

Namely, in the first scan, the proportion by which the second liquid drops, which cause components of the first liquid drops to thicken, cohere or become insoluble, are applied to the recording medium is made to be small. Therefore, the first liquid drops which are applied on the recording medium spread on the recording medium. Even in cases in which an ejector having an ejecting defect is included among the first liquid drop ejectors, it is difficult for stripes to become conspicuous.

In the scans from the second scan on, the proportion by which the second liquid drops are applied onto the recording medium is made to be large. Therefore, the density can be improved, and feathering can be suppressed. Moreover, it is difficult for the difference in density and the difference in color tone between the portion of defective ejection and the other portions to become conspicuous.

The first range which is defined by the first value is a range such that the first liquid drops, which are applied to the recording medium, spread a predetermined size or more. The second range which is defined by the second value is a range such that the density of the first liquid drops, which are applied to the recording medium, improves, and feathering can be suppressed.

If the first liquid drops are applied excessively in the first scan, the image quality with respect to density and color tone deteriorates. Therefore, the applied amount, per unit surface area, of the first liquid drops in the first scan is made to be smaller than the applied amount, per unit surface area, of the first liquid drops in the scans from the second scan on. In this way, the image quality does not deteriorate, and the image quality can be improved.

Here, the drop amount means the amount per one drop. By making the drop amount of the first liquid drops in the first scan be smaller than the drop amount in the scans from the second scan on, the image quality can be improved.

By making the drop amount of the second liquid drops in the first scan be smaller than the drop amount in the scans from the second scan on, it is easy for the first liquid drops, which are applied to the recording medium in the first scan, to spread, and therefore, stripes become inconspicuous.

The surface tension being lower to a certain extent results in the first liquid drops, which are applied to the recording medium in the first scan, being easy to spread.

Here, a liquid drop ejector with an ejection defect means a liquid drop ejector which does not eject liquid drops at all or whose ejecting amount is extremely low, or a liquid drop ejector whose ejecting direction is bent, or the like. It is easy for a stripe to arise at the portion of the ejection defect. Therefore, the ejecting of the first liquid drops and the second liquid drops in the first scan and in the scans from the second scan on only at the portion of the ejection defect, is controlled as described above. In this way, the formation of stripes due to non-ejection or directional bending or the like of a liquid drop ejector can be prevented, and image quality can be improved.

It is easy for stripes, which are formed in a solid image or a halftone image, and in particular, in a solid image or a halftone image having a large surface area to a certain extent, to be conspicuous. Accordingly, in a case in which a solid image or a halftone image of a predetermined size or greater is to be recorded, the ejecting of the first liquid drops and the second liquid drops in the first scan and in the scans from the second scan on, is controlled as described above. In this way, the formation of stripes due to non-ejection or directional bending or the like of a liquid drop ejector can be prevented, and image quality can be improved.

The present invention can also be provided as a liquid drop ejecting device which includes the above-described controller, as a liquid drop ejecting method which realizes the operations of the controller, and as a machine-readable storage medium which stores a program which realizes the operations of the controller.

What is claimed is:

1. A controller that controls a liquid drop ejecting device including a first head at which a plurality of first liquid drop ejectors, which eject first liquid drops containing a coloring material, are arrayed, and a second head at which a plurality of second liquid drop ejectors, which eject second liquid drops that cause components of the first liquid drops to thicken, cohere or become insoluble, are arrayed, longitudinal directions of the first and second heads are generally orthogonal to a sheet conveyance direction, and the first and second heads are full width array heads that extend over generally a full width of a recording medium, the controller comprising:

a scanning control section that controls scanning such that, among the first head and the second head, at least the first head scans a plurality of times relative to a corresponding identical region and no other region of a recording medium during said plurality of scans, wherein a first scan is a scan before any other scans of said corresponding identical region and a second scan is a scan that directly follows said first scan; and an ejection control section that controls ejecting of the first head and the second head such that, among the plurality of times of scanning, a proportion of an applied amount, per unit surface area, of the second liquid drops onto the recording medium with respect to an applied amount, per unit surface area, of the first liquid drops onto the recording medium in said first scan is greater than or equal to 0 and less than or equal to a first value, the proportion from said second scan on is greater than or equal to a second value and less than or equal to 1, and the proportion in the first scan is smaller than the proportion from the second scan on;

wherein the controller is applied to the liquid drop ejecting device in which a recording medium is conveyed and the heads are fixed while a printing process is performed, wherein the corresponding identical region of the recording medium is a region to be scanned with one or more defective ejectors in the first liquid drop ejectors, and the ejection control is carried out only at the corresponding identical region and other regions of the recording medium are scanned only once by the first and second heads.

2. The controller of claim 1, wherein the first value is 0.3, and the second value is 0.1.

3. The controller of claim 1, wherein the ejection control section controls the ejecting of the first head such that an applied amount, per unit surface area, of the first liquid drops onto the recording medium in the first scan, is less than an applied amount, per unit surface area, of the first liquid drops onto the recording medium from the second scan on.

4. The controller of claim 1, wherein the ejection control section controls the ejecting of the first head such that a drop amount of the first liquid drops in the first scan is less than a drop amount of the first liquid drops from the second scan on.

5. The controller of claim 1, wherein the ejection control section controls the ejecting of the second head such that a drop amount of the second liquid drops in the first scan is less than a drop amount of the second liquid drops from the second scan on.

6. The controller of claim 1, wherein surface tensions of the first liquid drops and the second liquid drops are in a range of approximately 25 to 35 mN/m.

7. The controller of claim 1, wherein control by the ejection control section is carried out with respect to a region at which an image is formed by, among the plurality of first liquid drop ejectors arrayed at the first head, first liquid drop ejectors that are arrayed within a predetermined range that includes a first liquid drop ejector with an ejection defect.

8. The controller of claim 1, wherein control by the ejection control section is carried out with respect to a region, within the recording medium, at which at least one of a solid image and a halftone image of a predetermined size or larger is formed.

9. The controller of claim 1, wherein the controller carries out the ejection control based on defective ejector information stored in advance and which indicates a position of the defective ejector in the first liquid drop ejectors.

10. A liquid drop ejecting device comprising:

a first head at which a plurality of first liquid drop ejectors, which eject first liquid drops containing a coloring material, are arrayed;

a second head at which a plurality of second liquid drop ejectors, which eject second liquid drops that cause components of the first liquid drops to thicken, cohere or become insoluble, are arrayed;

longitudinal directions of the first and second heads being generally orthogonal to a sheet conveyance direction, and the first and second heads being full width array heads that extend over generally a full width of a recording medium; and a controller, wherein the controller includes:

a scanning control section that controls scanning such that, among the first head and the second head, at least the first head scans a plurality of times relative to a corresponding identical region and no other region of a recording medium during said plurality of scans, wherein a first scan is a scan before any other scans of said corresponding identical region and a second scan is a scan that directly follows said first scan; and an ejection control section that controls ejecting of the first head and the second head such that, among the plurality of times of scanning, a proportion of an applied amount, per unit surface area, of the second liquid drops onto the recording medium with respect to an applied amount, per unit surface area, of the first liquid drops onto the recording medium in said first scan, is greater than or equal to 0 and less than or equal to a first value, the proportion from said second scan on is greater than or equal to a second value and less than or equal to 1, and the proportion in the first scan is smaller than the proportion from the second scan on;

wherein the controller is applied to the liquid drop ejecting device in which a recording medium is conveyed and the heads are fixed while a printing process is performed, wherein the corresponding identical region of the recording medium is a region to be scanned with one or more defective ejectors in the first liquid drop ejectors, and the ejection control is carried out only at the corresponding identical region and other regions of the recording medium are scanned only once by the first and second heads.

11. The liquid drop ejecting device of claim 10, wherein the controller carries out the ejection control based on defective ejector information stored in advance and which indicates a position of the defective ejector in the first liquid drop ejectors.

12. A liquid drop ejecting method of ejecting liquid drops in a liquid drop ejecting device including a first head at which a plurality of first liquid drop ejectors, which eject first liquid drops containing a coloring material, are arrayed, and a second head at which a plurality of second liquid drop ejectors, which eject second liquid drops that cause components of the first liquid drops to thicken, cohere or become insoluble, are arrayed, and in said liquid drop ejecting device a recording medium is conveyed and the heads are fixed while a printing process is performed, longitudinal directions of the first and second heads are generally orthogonal to a sheet conveyance direction, and the first and second heads are full width array heads that extend over generally a full width of a recording medium, the method comprising:

controlling scanning of the first head and the second head such that, among the first head and the second head, at least the first head scans a plurality of times relative to a corresponding identical region and no other region of a recording medium during said plurality of scans, wherein a first scan is a scan before any other scans of said corresponding identical region and a second scan is a scan that directly follows said first scan; and controlling ejecting of the first head and the second head such that, among the plurality of times of scanning, a proportion of an applied amount, per unit surface area, of the second liquid drops onto the recording medium with respect to an applied amount, per unit surface area, of the first liquid drops onto the recording medium in said first scan is greater than or equal to 0 and less than or equal to a first value, the proportion from said second scan on is greater than or equal to a second value and less than or equal to 1, and the proportion in the first scan is smaller than the proportion from the second scan on, wherein the corresponding identical region of the recording medium is a region to be scanned with one or more defective ejectors in the first liquid drop ejectors, and the ejection control is carried out only at the corresponding identical region and other regions of the recording medium are scanned only once by the first and second heads.

13. The liquid drop ejecting method of claim 12, wherein the first value is 0.3, and the second value is 0.1.

14. The liquid drop ejecting method of claim 12, wherein the ejecting controlling controls the ejecting of the first head such that an applied amount, per unit surface area, of the first liquid drops onto the recording medium in the first scan, is less than an applied amount, per unit surface area, of the first liquid drops onto the recording medium from the second scan on.

15. The liquid drop ejecting method of claim 12, wherein the ejecting controlling controls the ejecting of the first head such that a drop amount of the first liquid drops in the first scan is less than a drop amount of the first liquid drops from the second scan on.

16. The liquid drop ejecting method of claim 12, wherein the ejecting controlling controls the ejecting of the second head such that a drop amount of the second liquid drops in the first scan is less than a drop amount of the second liquid drops from the second scan on.

17. The liquid drop ejecting method of claim 12, wherein surface tensions of the first liquid drops and the second liquid drops are in a range of approximately 25 to 35 mN/m.

18. The liquid drop ejecting method of claim 12, wherein the ejecting controlling is carried out with respect to a region at which an image is formed by, among the plurality of first liquid drop ejectors arrayed at the first head, first liquid drop ejectors which are arrayed within a predetermined range that includes a first liquid drop ejector with an ejection defect.

19. The liquid drop ejecting method of claim 12, wherein the ejecting controlling is carried out with respect to a region, within the recording medium, at which at least one of a solid image and a halftone image of a predetermined size or larger is formed.

20. The liquid drop ejecting method of claim 12, wherein the controller carries out the ejection control based on defective ejector information stored in advance and which indicates a position of the defective ejector in the first liquid drop ejectors.

21. A machine-readable storage medium that stores a program that causes a computer to execute control processing that controls a liquid drop ejecting device including a first head at which a plurality of first liquid drop ejectors, which eject first liquid drops containing a coloring material, are arrayed, and a second head at which a plurality of second liquid drop ejectors, which eject second liquid drops that cause components of the first liquid drops to thicken, cohere or become insoluble, are arrayed, and in said liquid drop ejecting device a recording medium is conveyed and the heads are fixed while a printing process is performed, longitudinal directions of the first and second heads are generally orthogonal to a sheet conveyance direction, and the first and second heads are full width array heads that extend over generally a full width of a recording medium, the control processing comprising:

controlling scanning of the first head and the second head such that, among the first head and the second head, at least the first head scans a plurality of times relative to a corresponding identical region and no other region of a recording medium during said plurality of scans, wherein a first scan is a scan before any other scans of said corresponding identical region and a second scan is a scan that directly follows said first scan; and controlling ejecting of the first head and the second head such that, among the plurality of times of scanning, a proportion of an applied amount, per unit surface area, of the second liquid drops onto the recording medium with respect to an applied amount, per unit surface area, of the first liquid drops onto the recording medium in said first scan, is greater than or equal to 0 and less than or equal to a first value, the proportion from said second scan on is greater than or equal to a second value and less than or equal to 1, and the proportion in the first scan is smaller than the proportion from the second scan on, wherein the corresponding identical region of the recording medium is a region to be scanned with one or more defective ejectors in the first liquid drop ejectors, and the ejection control is carried out only at the corresponding identical region and other regions of the recording medium are scanned only once by the first and second heads.

22. The machine-readable storage medium of claim 21, wherein the controller carries out the ejection control based on defective ejector information stored in advance and which indicates a position of the defective ejector in the first liquid drop ejectors.

* * * * *